United States Patent [19]

Turner et al.

[11] 4,452,527
[45] Jun. 5, 1984

[54] PHOTOGRAPHIC ENLARGER FOR USE IN BRIGHT LIGHT

[75] Inventors: George F. A. M. Turner, Ingatestone; Martin G. Hammond, Wickford, both of England

[73] Assignee: Ciba-Geigy AG, Basel, Switzerland

[21] Appl. No.: 436,907

[22] Filed: Oct. 27, 1982

[30] Foreign Application Priority Data

Nov. 4, 1981 [GB] United Kingdom ............... 8133196

[51] Int. Cl.³ .......................................... G03B 13/28
[52] U.S. Cl. ...................................... 355/45; 355/62; 355/43
[58] Field of Search .................. 355/28, 41, 44, 45, 355/61, 62, 64, 74, 125, 126, 127, 128; 353/66

[56] References Cited

U.S. PATENT DOCUMENTS

| | | | |
|---|---|---|---|
| 3,644,036 | 2/1972 | Canfield | 355/44 |
| 3,773,419 | 11/1973 | Sumner et al. | 355/43 |
| 3,890,043 | 6/1975 | Pramstraller | 355/62 |
| 4,053,219 | 10/1977 | Damm et al. | 355/27 |

FOREIGN PATENT DOCUMENTS

| | | |
|---|---|---|
| 1120396 | 12/1961 | Fed. Rep. of Germany . |
| 2847187 | 6/1979 | Fed. Rep. of Germany . |
| 1300965 | 7/1962 | France . |
| 2455756 | 11/1980 | France . |

Primary Examiner—Donald A. Griffin
Assistant Examiner—D. Lee
Attorney, Agent, or Firm—Harry Falber

[57] ABSTRACT

A photographic enlarger for use in bright light comprises a light-tight space which is enclosed in a casing, a bellows and a box thereon; the box is displaceably mounted on the casing for upward and downward adjustment and contains a light source emanating projecting light, a transparency holder, an enlarging objective and a deflecting mirror. On the floor of the casing a carrier block, which is displaceable freely on the floor in any direction, carries a lenticulated reflecting screen and a hingedly connected masking frame. A light-tightly closable window is provided in the box and permits viewing through the same, when open, the entirety of the surface of the lenticulated screen via the said deflecting mirror. In the front wall of the casing, two handholes having light-tight covering means are provided which allow for manipulation of the carrier block and of the masking frame and also render it possible to switch the light source on and off by means of a light switch inside the casing.

Focussing can be carried out when the window is open, via the deflecting mirror by observing the very bright enlarged image of the transparency on the lenticulated screen. Inside the casing, a sheet of unexposed photographic paper can be taken out of a light-tight envelope and can be placed on the screen, exposed thereon and then returned again to the light-tight envelope.

6 Claims, 1 Drawing Figure

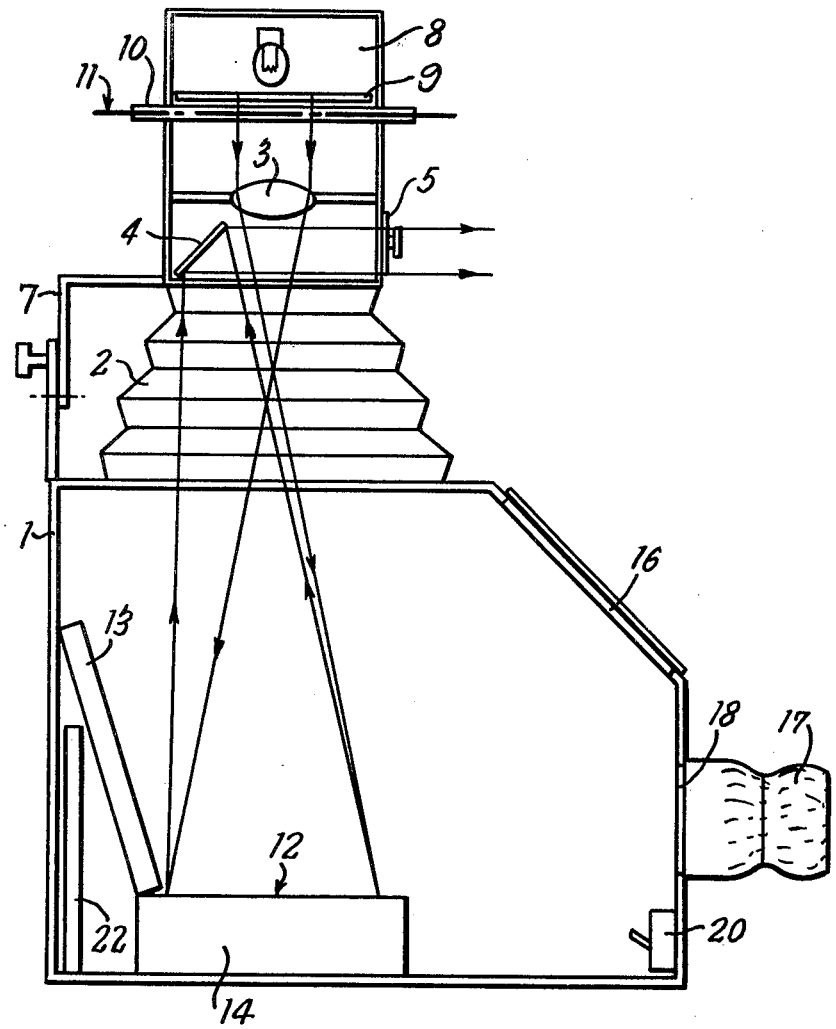

PHOTOGRAPHIC ENLARGER FOR USE IN BRIGHT LIGHT

BACKGROUND OF THE INVENTION

This invention relates to a photographic enlarger for use in bright light having a light-tightly enclosed space, a transparency holder and an enlarging objective means therein, which space includes the image plane of the enlarging objective.

In recent years photography as a hobby has become increasingly popular but photo-hobbyists are finding it increasingly difficult to find a room at home which they can use as a dark-room where they can develop and print their films. Thus, to overcome this problem, recently there have been introduced devices which enable the whole processing and printing process to be carried out in normal daylight conditions, that is to say in un-blacked-out rooms using normal lighting conditions. One piece of apparatus required is a daylight enlarger. Such enlargers often consist of an enlarger frame or casing draped with light-opaque material, there being present a viewing window and a reflecting screen. When such an enlarger is used in daylight conditions it has been found difficult to focus a sharp image on the reflecting screen.

Most of the known enlargers for use in bright light, i.e., without requiring a dark room, do not incorporate special means with which to view the image in the device. However in the German Offenlegungsschrift No. 2,847,187 and in U.S. Pat. No. 3,890,043 enclosed frame enlargers are described in which a mirror movable into and out of the light projected through the transparency focuses an image of the transparency on a ground glass screen which is viewable by the operator from outside the enlarger. Such enlargers are of a rather complicated structure.

In French Pat. No. 2,455,756 there is described an overhead projector in which a transparency is focussed on a fresnel lens and then reflected upward to a condenser lens and to an inclined mirror which projects the image on to a screen. This is not an enlarger and certainly not an enclosed frame enlarger. Moreover a fresnel lens will only function in association with optical means required to derive a viewable image which are very expensive and complex.

OBJECTS AND SUMMARY OF THE INVENTION

It is therefore an object of the present invention to provide an enlarger which can be focussed very satisfactorily under daylight conditions and when the image is viewed through a light filter, and which is relatively inexpensive.

It is another object of the invention to provide an enlarger of the initially described type which can be charged with a sheet or film of photographic material on which the focussing of an enlarged image can be controlled by separate viewings through a light filter as well as through a window in the enlarger hull or casing.

These and other objects which will become apparent in the following description can be attained, in accordance with the invention, by providing an enlarger of the initially described type, which comprises, as inventive features, a lenticulated reflecting screen disposed in the image plane of the enlarging objective, a mirror within the range of light rays reflected by the said screen, and a window-type opening in the light-tightly enclosed space, through which opening the said mirror deflects toward the outside at least a portion of the light rays reflected by the said screen, the said mirror being of such size and disposed in a position in the said space such as to render an image focussed on the said screen completely visible through the said opening.

Preferred embodiments of the enlarger according to the invention comprise one or several of the following features:

The mirror can be adapted for deflecting at least part of the light reflected from the lenticulated screen in a direction forming an angle of about 90° with the optical axis of the enlarging objective.

On the other hand, the mirror can be a fully reflecting mirror set at an angle of 45° with the optical axis of the enlarging objective and near the path of imaging light from the said enlarging objective to the lenticulated reflecting screen.

The mirror can also be a semi-transparent mirror located in the path of the light from the enlarging objective to the lenticulated screen and set at 45° with the optical axis of the objective. This semi-transparent mirror is mounted by means which permits its removal from the said light path during the exposure step.

In the case of a fully reflecting mirror, the latter is preferably next adjacent the path of image-forming light emanated by the said objective and received by the reflecting screen.

By use of the enlarger of the present invention a brilliantly clear image of the film transparency in the enlarger can be seen in the mirror in very bright internal lighting conditions, through the window-type opening. This image in the mirror can be used to focus the image on the lenticulated screen.

In one embodiment of the invention the enlarger is partially enclosed in a light-opaque material drape. In another embodiment of the invention the enlarger frame comprises a rigid light-opaque box-like structure.

Due to the presence of a lenticulated screen in the enlarger according to the invention, it is necessary to use the light reflected by the screen in substantially the same optical axis as the incident light because image light reflected from a lenticulated screen under an angle of more than 15° from the incident light is greatly degraded. However, by use of the mirror inclined at an angle of 45° with regard to the optical axis of the image light, which mirror diverts part of the light reflected from the lenticulated screen substantially along the path of the incident light, an extremely clear image of the transparency is obtained on the mirror. Moreover the mirror may be set at a height convenient for an operator.

A lenticulated screen suitable for use in the enlarger according to the invention can be made from the material used to prepare road signs, projection screens, and, especially in England, car number plates, and preferably has a reflecting surface formed by glass beads.

BRIEF DESCRIPTION OF THE DRAWING

Further details and advantages of the enlarger according to the invention and further objects attained thereby will become apparent from the further description of the same in connection with the accompanying drawing in which the single FIG. 1 is a schematic longitudinal sectional view through a preferred embodiment of the said enlarger.

DETAILED DESCRIPTION OF THE EMBODIMENT SHOWN IN THE DRAWING

The enlarger shown in FIG. 1 comprises a rigid, light-tight casing 1, made preferably from polystyrene or another suitable opaque material, at the top end of which casing there is located an extensible bellows 2 which can be lengthened or shortened to a desired position by adjusting the height of a displaceable frame 7 in which position the bellows can be fixed by a set screw 23. The frame 7 comprises, above the upper bellows end, an enlarger head constituted by a mounting or box 24 which contains a transverse wall 25 bearing an enlarging objective 3 the optical axis of which extends, in the position shown in the drawing, perpendicularly with regard to the bottom 15 of the casing 1; the objective can be raised or lowered by hand in the mounting 24 along its optical axis and fixed in a desired position, by means of a knob 28.

In the upper end wall of the mounting 24 there is provided a transparency holder 10 which can carry a transparency 11 to be enlarged, for instance a film negative. Above the transparency holder 8, a light source 26 is held in a lamp-holder 8; the path of the light rays from the source 26 extends along the optical axis of the enlarging system, through transparency 11, the enlarging objective and the bellows 2 into the interior of the casing 1 toward the floor 15 of the latter. A light diffusing disc 9 of opal glass is preferably interposed between the light source 26 and the transparency holder 10, and can be attached to the lamp holder 8.

Underneath the objective 3, a lenticulated screen 12, which has a surface of glass beads and is mounted in a screen carrier 14, is placed on the floor 15 of the casing 1, and can be moved in any direction required to have the optical axis of the objective 3 pass through the surface of the screen 12 at a desired point. A masking frame 13, which serves to limit the image field on the surface of the screen 12, is hingedly connected to one side of the screen holder 14. In the drawing, the masking frame 13 is raised to be turned away from the path of the light rays.

Spaced from the optical axis, a fully silvered mirror 4 is lodged in the mounting 24 below the level of the objective 3, and is set at an angle of 45° with regard to the optical axis, whereas a light-tightly closable window 5 is provided in a wall of the mounting 24 opposite the mirror 4, on the other side of the optical axis.

In lieu of the fully reflecting mirror 4, there can be used a semi-transparent mirror which is indicated by dashed lines in the drawing, and is designated by the reference numeral 4'. This mirror 4' is arranged in the direct path of image-forming light rays, between the objective 3 and the screen 14, preferably, as shown in the drawing, at the upper entry opening of the bellows 2, and deflects a portion of the light rays through the window 5. The mirror 4' is preferably mounted in displacing means permitting the withdrawal of the mirror from the aforesaid path of light.

Means for mounting and shifting optical elements in the enlarger are well known to the experts in this field; the illustration and description of such elements has, therefore, been dispensed with, in order to simplify the drawing.

The level of the frame 7, and together therewith the box 24, can be so adjusted that a desired scale of enlargement of the image of the trespancy is produced by the enlarging objective 3 on the screen 12. This also permits selecting a desired area of a transparency to be projected on the screen 12. Focussing can then be attained by adjustment of the objective 3 by means of the objective-focussing knob 28. The adjustment of the level of the box 24 and the focussing of the image on the screen 12 can be combined in a known manner so that focussing will be carried out automatically for each enlarging scale selected. Automatic focussing devices are well known to an optical expert, and described in many publications; their illustration and description have, therefore, been dispensed with.

An exchangeable light filter 16 is mounted in an oblique wall of the casing 1 which joins the top end of the casing under an angle of preferably 45°; the light filter 16 is, for instance, capable of filtering out all ambient light below 550 nm.

In the front wall 27 of the casing 1, there are provided two light traps comprising two apertures serving as hand holes 18 each provided with a hand-hole cover 17 of opaque material. The user can insert his hands through the hand holes 18, both simultaneously, or one or the other hand alone, into the interior of the casing 1 without letting any noticeable amount of light penetrate into the casing 1 from the outside. Only the left-hand one of the hand holes 18 and covers 17 is visible in the drawing, the other, right-hand one is located behind the left-hand one. A light switch 20 can be affixed inside or outside the casing 1, in the former case at a place which is easily accessible from a hand hole 18.

In the drawing, arrows having fully drawn lines indicate the path of the light rays from the light source 26 or the light diffusing disc 9 through the negative 11 to be enlarged and the objective 3 on to the lenticulated screen 12. The larger part of these rays is reflected along or parallel with the optical axis of the incident light. A portion of the reflected light, however, is received by the downwardly directed silvered face of the fully reflecting mirror 4 and is so deflected by the latter that it is directed out of the box 24 via the open window 5.

In operation a light-tight envelope 22 containing a sheet of photographic paper is stood inside the casing 1 at a readily accessible place. The negative 11 is placed in the holder 10 and a desired filter 16 is inserted in the inclined wall face of the casing 1. The operator then inserts his hands through the hand holes 18 protected against the entry of light by the covers 17 and switches on the light source 26, by actuating the switch 20.

The user then closes the masking frame 13 down onto the lenticulated screen 12, and moves the screen holder 14 to a position in which a desired portion of the enlarged image of a desired degree of enlargement is visible on the screen 12; this is obtained by adjustment of the height of the bellows 2 and thus the level of the box 24, with the aid of the frame 7 set in the adjusted position by means of the set screw 23.

The image is then focussed on the screen 12 by adjusting the objective 3 by means of the focussing-knob 28. The selection of the desired image section, being centered within the masking frame 13 on the screen 12, by a corresponding adjustment of the scale of enlargement and by moving the screen holder 14 can be attained by viewing through the filter disc 16 and/or through the open window 5.

The sharp focussing of the image on the screen 12, however, requires observation of the image in the mirror 4 or 4' which is viewed by the user only through the open window 5.

A simplified embodiment of the enlarger according to the invention comprises a fixed-focus objective 3. In this case, the focussing of the enlarged image on the screen 12 is effected by a corresponding adjustment of the level of the box 24 which is raised or lowered on the frame 7 and is set in the desired position by means of the set screw 23. The scale of enlargement of the image on the screen 12 is a fixed one.

When the correct focus has been obtained the user switches off the light source 26 by actuating the switch 20 and shuts the window 5. He then reinserts his hands into the handholes 18 and lifts frame 13, removes the unexposed sheet of photographic paper from the envelope 22 inside the casing 1 and places the sheet on the screen 12 wherein he closes the masking frame 13 again. He then exposes the sheet by turning on the light source 26 using the switch 20. After terminating the exposure by turning off the light source 26, he removes the sheet after lifting the masking frame 13 and returns the sheet to the envelope 22. He then withdraws his hands from the handholes 18 and removes filter 16. Lastly, he removes the envelope 22 from the casing 1 so that the exposed sheet in the cassette can be processed further.

In the embodiment comprising a semi-transparent mirror 4' the latter is withdrawn to one side from the path of light between the objective 3 and the reflecting screen 12, while the exposure of the sheet underneath the closed masking frame 13 is carried out on the screen 12.

The envelope 22 can consist of a cassette, which, when closed, is light-tight, but permits a flow of liquid to be passed through it. After having exposed, a sheet of photographic material is introduced into a cassette of this type and the cassette is then closed. The cassette containing the exposed sheet is then removed from the casing and is subjected to the conventional treatments in different baths and ultimately to rinsing in water. The cassette can also be of the type in which the exposure of the photographic sheet therein can be carried out while the cassette is open.

We claim:

1. A photographic enlarger for use in bright light comprising a casing having a light-tightly enclosed space therein; a transparency holder; an enlarging objective means having an optical axis and forming an enlarged image in an image plane, said space including the image plane of the enlarging objective; a lenticulated reflecting screen disposed in the image plane of the enlarging objective and adapted for reflecting light rays incident from said objective; a mirror within the range of the light rays reflected by said screen; and a window-type opening in said enclosed space, through which opening said mirror deflects toward the outside at least a portion of the light rays reflected by said screen, said mirror being of such size and disposed in a position in said space such as to render an image focussed on the said screen visible through the said opening.

2. The enlarger of claim 1, wherein said mirror is adapted for deflecting at least part of the light-reflected from said lenticulated screen in a direction forming an angle of about 90° with the optical axis of said enlarging objective.

3. The enlarger of claim 2, wherein said mirror is a fully reflecting mirror set at an angle of 45° with regard to the optical axis of said enlarging objective and near the path of imaging light from said enlarging objective to said lenticulated reflecting screen.

4. The enlarger of claim 3, wherein said fully reflecting mirror is positioned next adjacent the path of image-forming light emanated by said objective.

5. The enlarger of claim 2, wherein said mirror is a semi-transparent mirror located in the image-forming light path from the enlarging objective to the lenticulated screen and set at an angle of 45° with regard to the optical axis of the objective.

6. The enlarger of claim 5, wherein said semi-transparent mirror comprises mounting-means adapted for removing said semi-reflected mirror from said light path, and returning said mirror into said light path.

* * * * *